July 26, 1949.  J. H. BUCKNAM ET AL  2,477,041
MACHINE FOR SEVERING AND SHAPING METAL PLATES
Filed Jan. 9, 1945  3 Sheets-Sheet 3
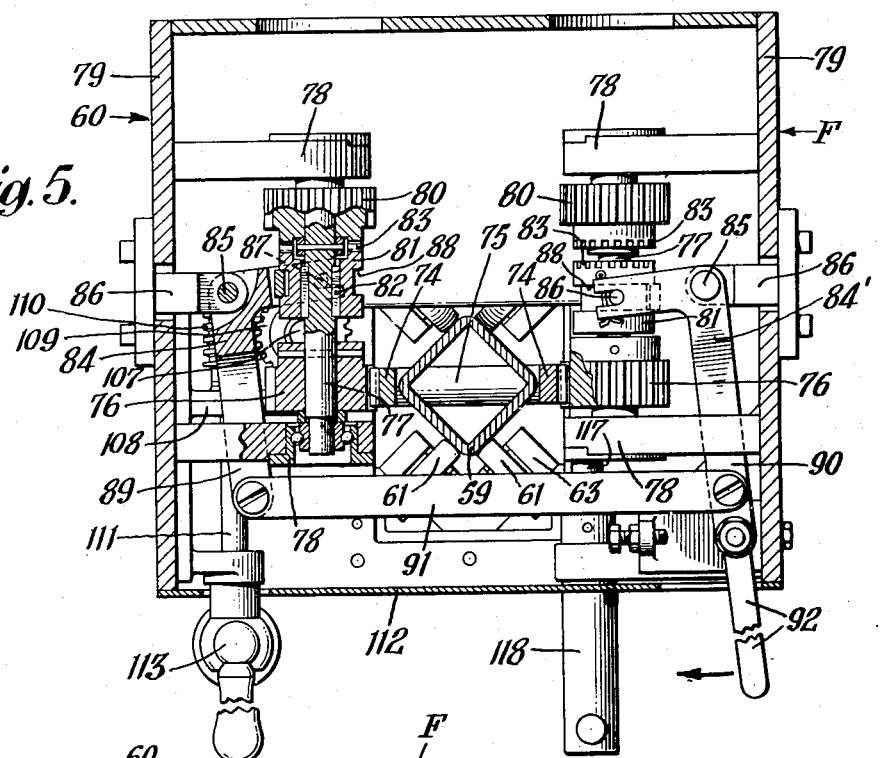
INVENTORS
JAMES H. BUCKNAM
JOHN H. ROUNTREE
BY
ATTORNEY Patented July 26, 1949

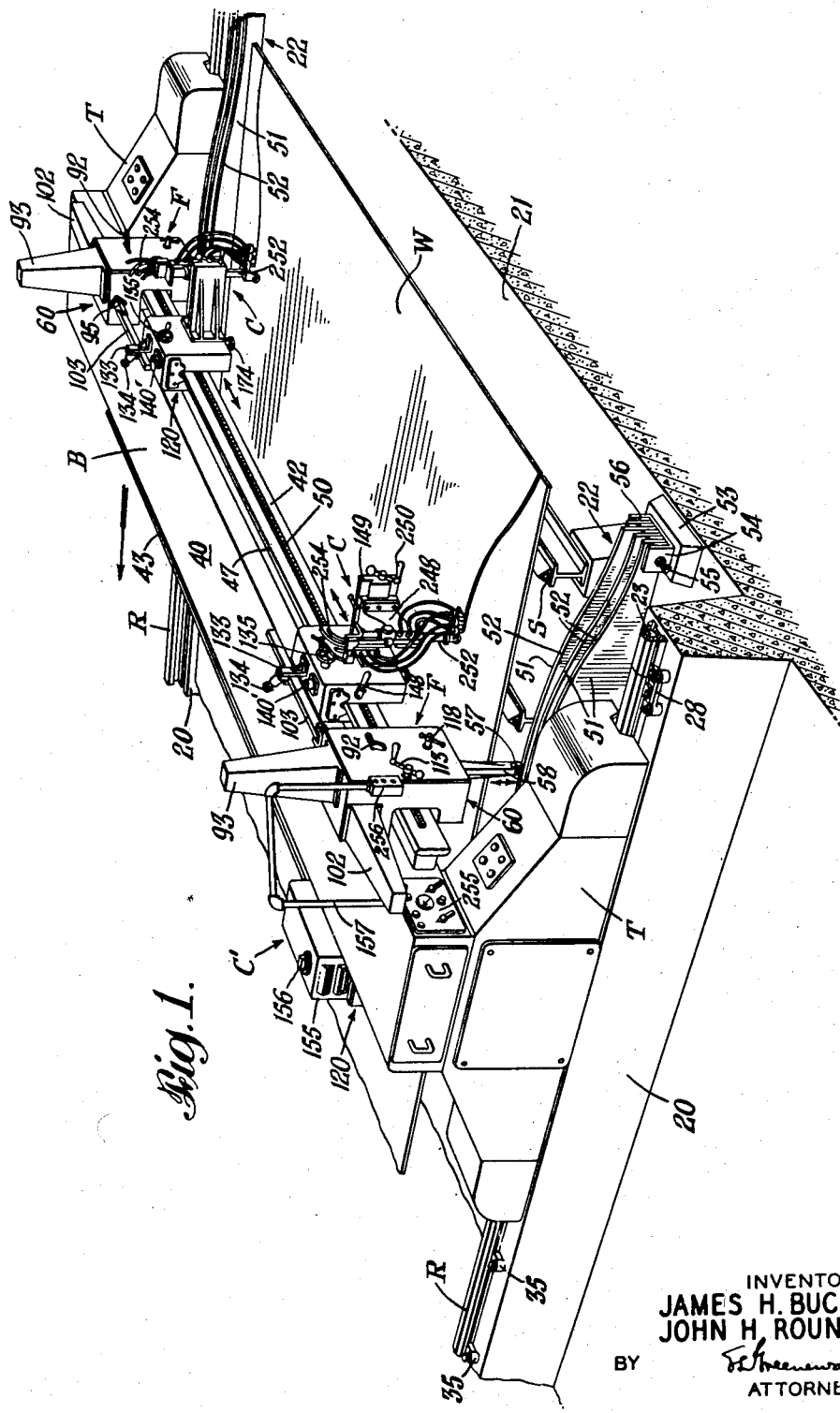

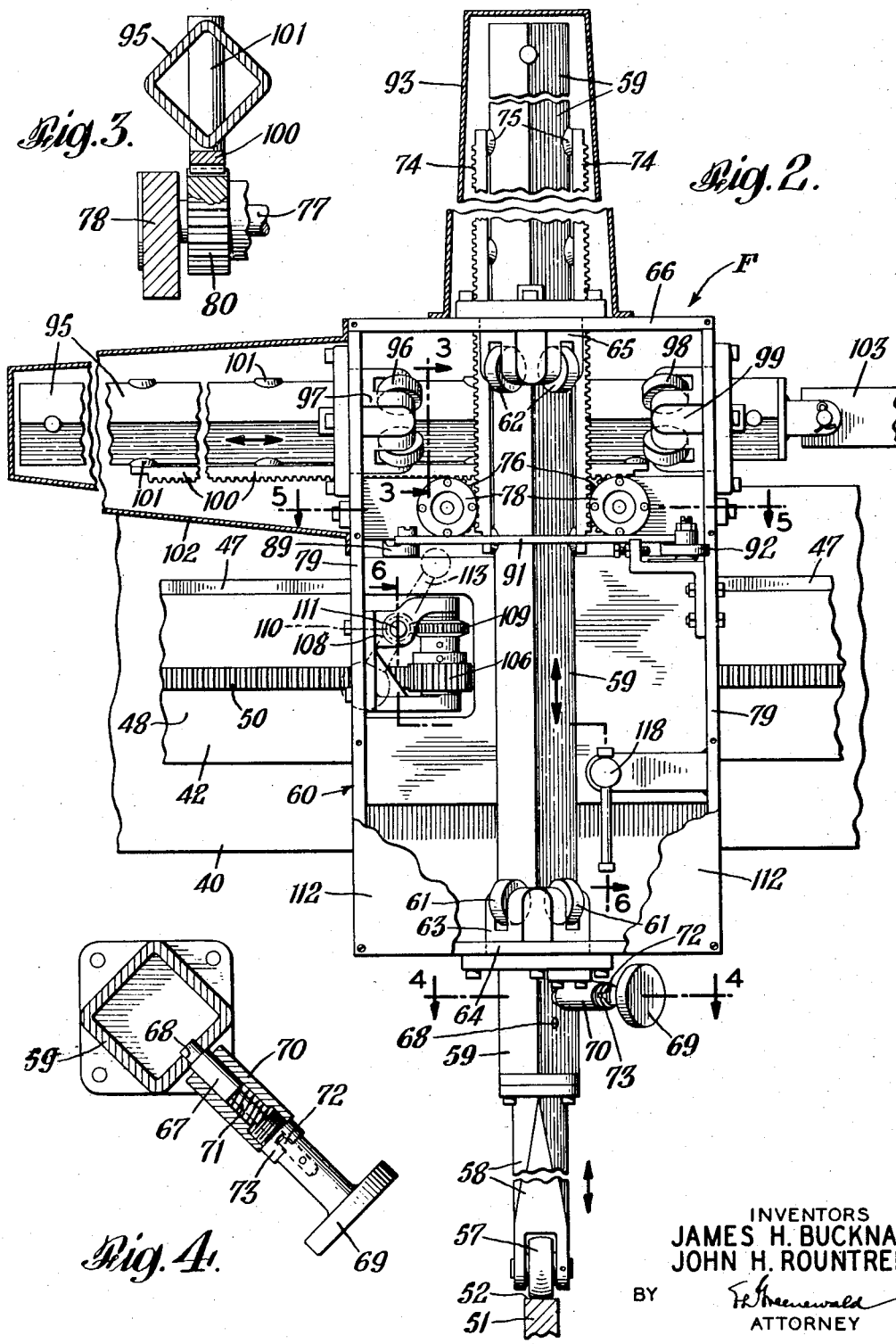

2,477,041

UNITED STATES PATENT OFFICE 2,477,041

MACHINE FOR SEVERING AND SHAPING METAL PLATES

James H. Bucknam, Cranford, and John H. Rountree, Plainfield, N. J., assignors to The Linde Air Products Company, a corporation of Ohio Application January 9, 1945, Serial No. 572,064

6 Claims. (Cl. 266—23)

This invention relates to machines for severing and shaping metal plates, and more particularly to a machine for propelling one or more blowpipes horizontally in predetermined paths so as to cut or both cut and bevel metal plates according to desired shapes and edge contours.

Shape-cutting machines or reproducing machines for moving a blowpipe in a horizontal plane in any desired direction within limits have been constructed on the principles that no resistance against movement occurs between the blowpipe and the workpiece and, as a result, the shape-cutting machines customarily used are of light construction which is satisfactory for small workpieces. If large pieces of metal, such as ship plates, are to be cut, a machine having greater cutting capacity is required, but if such a machine were constructed according to the principles of the customary shape-cutting machines, it would be impossible to maintain the cutting accuracy which is required. The handling of large plates is diffiult and it is therefore desirable to perform as many of the cutting and trimming operations as possible without handling the plate between such operations.

For oxy-fuel gas or oxy-acetylene cutting of large plates such as ship plates to size, for forming desired edge contours on such plates, and for beveling the edges of such plates to prepare them for subsequent welding, there is provided according to this invention, a mechanism which is known as a "flame planer." Such a flame planer installation includes one or more types of cutting mechanisms capable of operation simultaneously on different portions of the plate to be cut to size and shape. The entire flame planer and the sub-assemblies included are of heavy duty construction and so designed as to be capable of making precision cuts even after long continued use.

The flame planer, according to the present invention, consists of at least one bridge member that extends transversely across the workpiece and is supported at each end on carriages or trucks which run on longitudinal rails at each side of the workpiece. The rails are accurately leveled and maintained straight and parallel and the workpiece is horizontally supported on a cutting bed comprising either stationary supports or a roller conveyor disposed between the rails. The flame planer includes one or more sub-assemblies or cutting units which may be all mounted on one bridge member or some units may be mounted on one bridge member and others on other bridge members. The cutting units are of different type so as to be capable of trimming and beveling the longitudinal edges, of making shape cuts such as fairing cuts on ship plates, and of beveling the cut edges.

For longitudinal cuts, preferably two cutting units are mounted on a bridge member in order to trim and bevel both longitudinal edges of the plate. For such operations one of the bridge trucks is motor driven at cutting speed along its track. For shape cutting and making fairing cuts, a cutting unit is mounted on a carriage transversely movable along a track secured to the bridge, and the carriage is moved in the transverse direction by a templet-follower mechanism while the bridge is moved longitudinally by a drive motor in one of the trucks. The templet-follower mechanism preferably includes a vertically movable cam follower engageable with any one of several templets or patterns mounted in vertical planes parallel to and adjacent the tracks.

Accordingly, the principal objects of the present invention are: to provide an improved cutting mechanism capable of accurately trimming and shaping large plates; to provide such a machine having right stability and rigidity, and which provides smooth and accurate travel of cutting units; to provide such a machine which carries a plurality of cutting units so that a variety of cutting operations can be performed and so that several cutting operations can be performed on the same workpiece at the same time; to provide such a machine which can be installed in a production line; to provide such a machine which can be controlled by a single operator; to provide a shape-cutting machine in which a plurality of templets are provided and a templet-follower mechanism can be shifted to engage with any selected one of such templets; to provide a cutting machine in which horizontal shaping cuts can be made according to templets mounted in a vertical plane so that a plurality of templets can be mounted in relatively small space.

Other objects of the invention will appear below; and while details of the embodiments disclosed by way of example are set forth, the invention is not limited to these, since changes may be made without departing from the scope of the invention as claimed.

Referring to the drawings:

Fig. 1 is a perspective view of a flame planer according to the present invention showing a bridge member with three cutting units mounted thereon, two of which are arranged for making fairing cuts;

Fig. 2 is an elevational view of the left-hand templet-follower mechanism with forward parts broken away to show the internal construction;

Fig. 3 is a fragmentary view of a section taken along the line 3—3 of Fig. 2;

Fig. 4 is a view of a section taken on the line 4—4 of Fig. 2 for showing the lock device;

Fig. 5 is a view of a section taken on the line 5—5 of Fig. 2 showing the reversing clutch mechanism;

Fig. 6 is a view of a section taken on the line 6—6 of Fig. 2 showing the templet-follower positioning and locking devices.

Referring now particularly to Fig. 1, the large plate to be shaped and cut to size is illustrated at W. Such plate is preferably supported horizontally by suitable means such as indicated at S. The supporting means may be stationary and the plate W placed thereon by a crane or the support may comprise conveyor roller such as are customarily used for handling large metal plates. Longitudinally along either side of the plate W are tracks or rails R mounted on suitable foundation beams 20. Such beams 20 preferably are of concrete and are joined by a substantial foundation floor 21 so that the beams 20 are rigidly connected. A bridge member B extends transversely across the plate W and is rigidly mounted at each end on trucks T arranged to run on the rails R. Supported by the bridge member B are right and left side cutting units C. The bridge member also supports right and left side templet-follower mechanisms F which move the cutting units C transversely according to the contour of a selected one of the templets 22.

The rails are composed of a plurality of lengths held accurately in end-to-end relation. One or both of the rails are tubular in form and have a longitudinal cooling passage 23 therein. There is one plate 28 under each rail joint but additional rail anchors 35 are provided between the joints. By loosening screws 34 on one side and tightening those on the other side, the rail sections can be shifted laterally, and when both bolts are tightened, the rail is tightly secured to the plates 28 in accurate alignment.

The bridge member B has ends rigidly secured to the upper portions of the trucks T thereby forming a bridge unit which is movable along the rails R without any deviation of the bridge member from perpendicular relation to the rails R or any variations in level.

The bridge member is preferably constructed in the form of a stiff box girder 40. Such a girder 40 has means provided along both front and rear edges for mounting track members or track carrying devices thereon. As shown in Fig. 1, track members 42 and 43 are secured respectively along the front and rear edges of the girder 40. Portions of the track member 42 are shown in Figs. 2 and 6 from which it will be seen that the track members 42 preferably have a hollow rectangular cross section and include mounting plate portions 44 spaced along the rear side which are secured to mounting pads 45 of the girder 40. Along the upper edge of the front wall 46 of each track member 42 are upper ways 47 which are arranged at 90° to each other and at 45° to the horizontal. The lower outstanding portion of the front wall 46 has a front face providing a guideway 48 and a chamfered rear surface forming a fourth guiding surface 49. The track member 42 is also provided with a longitudinal toothed rack 50 which is secured to the middle of the front wall 46.

Parallel to and inside of the rails R and beams 20 are mounted the sets of templets 22. The templets 51 in each set are long strips of any suitable material such as metal mounted in vertical planes and have cam surfaces 52 along their upper edges. The cam surfaces preferably have an outline of exactly the same shape as the outline or contour of the edge to be cut in the plate W. The templets 51 are suitably supported upon the bed 21 by mounting blocks 53 to which are secured U-clamps 54 provided with clamping screws 55. The templets are preferably spaced apart by spacer plates 56 interposed between them. A set of templets 22 is provided at each side of the plate W so that both longitudinal edges of the plate can be shape cut to the desired contour which contour can be the same or different on each side. Any one of the cam surfaces of the templets on either side may be engaged by a cam follower roller 57 of the corresponding templet-follower mechanism F. The left-hand templet-follower mechanism is illustrated in Figs. 2 to 6, inclusive, and since the right-hand templet-follower mechanism differs only in orientation the left-hand unit only will be described.

The cam-follower roller 57 is rotatably mounted at the lower end of a vertical post 58 which has a slider portion 59 of square cross-section that is preferably hollow to avoid excessive weight. The slider portion 59 is vertically movable through a box-like frame 60 and is guided by a lower set of rollers 61 and an upper set of rollers 62. Four such rollers in each set are provided for engaging the four sides of the slider 59. The lower rollers 61 are freely rotatable in suitable bearings 63 mounted on the bottom wall 64 of the frame 60. The upper rollers 62 are freely rotatable in bearings 65 which are secured to the top wall 66 of the frame 60. For retaining the slide 59 in an extreme upper position a retaining pin 67 is provided to engage with a hole 68 in one side of the slide 59. The pin 67 has a head 69 and is reciprocally mounted in a bracket 70 secured to the bottom of the frame 60. Suitable means is provided for retaining the pin 67 in the engaged or disengaged positions in the form of a spring 71 arranged to urge the pin toward the slide 59 and a tongue 72 on the neck of the head 69 which engages the end of an extension 73 of the bracket 70 when the head 69 is pulled out and turned a quarter turn. The tongue 72 enters a slot in the extension 73 when the pin 67 engages the hole 68.

The axis of the cam-follower roller 57 is parallel to the transverse diagonal of the slide 59 and the slide 59 is maintained so that its transverse diagonal is parallel with the side of the girder 40 and the track 42. Along the corners of the slide 59 through which its transverse diagonal passes, are secured two toothed racks 74. The racks 74 may be secured in any suitable manner and as illustrated herein, they are fastened to the ends of pins 75 which pass diagonally through the hollow slide 59. The laterally projecting teeth of the racks 74 mesh with pinions 76 which are mounted upon horizontal shafts 77 extending in the fore-and-aft direction on either side of the slide 59. The shafts 77 are rotatably mounted in suitable bearings 78 supported by and extending inwardly from the side walls 79 of the frame 60. The pinions 76 are preferably keyed or pinned to the shafts 77. Thus when the slide 59 is moved up and down both pinions 76 and the shafts 77 are rotated but the pinions and shafts on opposite sides will rotate in opposite directions. Other pinions 80 having the same number of teeth as the pinions 76 are freely rotatably mounted on the shafts 77 and are spaced from the pinions 76. Between each pinion 80 and the corresponding pinion 76 there is slidably mounted on the shaft 77 a clutch 81. The clutches 81 are keyed to the shaft 77 by splines 82 so that they are rotatable by the shafts 77 and axially slidable. The clutches 81 and the pinions 80 have corresponding intermeshing teeth 83 which are engageable by sliding the clutches 81 toward the pinions 80 so that when the teeth 83 are in engagement the pinions 80 are locked to the shafts 77 for rotation. Means for shifting the clutches are preferably provided in the form of forked bellcrank levers 84 and 84' which are fulcrummed at 85 to brackets 86 secured to the side walls 79. The forked portion of the levers 84 have clutch dogs 87 that engage grooves 88 in the clutches 81. The forwardly extending arms 89 and 90 are pivotally connected to the levers 84 and 84' by a link 91 so arranged that when the levers 84 are shifted to the right as shown in the drawing by a handle 92 secured to the arm 90, the left-hand clutch 81 will be engaged with its pinion 80 and the right-hand clutch 81 will be disengaged. When the handle 92 is shifted to the left, then the right-hand clutch 81 is engaged and the left-hand clutch is disengaged. The portion of the slide 59 which extends through the top wall 66 of the frame may be covered by a suitable guard or housing 93.

The vertical motion of the slide 59 is translated into horizontal motion of a horizontal slide 95 that passes through the side walls 79 near the upper end of the frame 60. The slide 95 is of similar construction to the slide 59 and may be supported for free longitudinal movement in a similar manner by a set of rollers 96 on bearings 97 secured to the left side wall 79 and a set of rollers 98 in bearings 99 secured to the right side wall 79. The horizontal slide 95 is disposed with its transverse diagonal vertical and has secured along its lower corner a rack 100 which may be similarly mounted at the lower ends of vertical pins 101 that pass vertically through the horizontal slide 95. The rack 100 is positioned to engage with both pinions 80 so that the rotation of either pinion will move the slide 95 longitudinally. Thus, when the handle 92 is in the position shown in Fig. 5 so that the left clutch 81 is engaged, movement of the vertical slide 59 downwardly will rotate the left pinion 76 and shaft 77 clockwise and cause pinion 80 to move the horizontal slide 95 to the right. Also upward movement of the vertical slide 59 will cause the slide 95 to move to the left. When the lever 92 is shifted to the left the right-hand clutch 81 is engaged and downward movement of the vertical slide 59 will cause leftward movement of the horizontal slide 95 while upward movement of the vertical slide 59 will cause rightward movement of the horizontal slide 95.

The above-described movement reversing mechanism is provided so that two kinds of shape cuts can be made according to a single templet. Thus, when the lever 92 is in the lefthand position, the horizontal slide 95 is moved in such manner that cuts are made having a contour directly according to the cam surface of the templet being used. When the lever 92 is in the right-hand position as shown, the slide 95 is moved in such a manner that cuts which are the inverse or mirror image of the contour of the cam surface of the templet are made. Thus, a single templet can make cuts on two plates which can subsequently be interfitted with each other. This in many instances reduces the number of templets required by one-half.

The portion of the horizontal slide 95 which projects to the left is preferably covered by a guard or housing 102. The end of the horizontal slide 95 which projects to the right is pivotally secured to a bar 103 which is connected to the carriage of a cutting unit C. Means for positioning the frame 60 along the track 42 is preferably provided. Secured to the frame 60 as found in Fig. 6, is a V-grooved member 104 arranged to slide along the upper ways 47 of the track 42. A slide bar 105 is also secured to the frame 60 in a position to engage the sliding surface 48 adjacent the lower part of the track member 42. For shifting frame laterally along the track member 42 there is provided a pinion 106 engaging with the teeth of the rack 50 and mounted on a vertical shaft 107 secured in bearings 108 supported by the left side wall 79 of the frame 60. The vertical shaft also carries a worm gear 109 which meshes with a worm 110 mounted on the inner end of a horizontal forwardly extending shaft 111. The shaft 111 passes through the front wall 112 of the frame 60 and carries a balanced crank 113. Thus, when the crank is rotated the worm drives the worm wheel which turns the pinion and advances the frame 60 along the track 42. To hold the cam-follower mechanism in position a track lock 114 is provided. The lock 114 is in the form of a wedge block that engages between the beveled way 49 of the track 42 and a horizontal surface 115 of the frame 60. The lock 114 has a threaded hole 116 engaging the threads of a forwardly extending screw 117. The forward end of screw 117 which extends through the front wall 112 has a handle 118 secured thereto so that when the handle is turned to the right the wedge lock 114 is drawn forwardly to lock the frame 60 to the truck 42. The handle 118 is unscrewed to release the frame 60.

The carriage C is shifted along the track 42 by the bar 103 which extends from the cam-follower mechanism F and passes through a bracket 133 secured to the top of the carriage C. The bar 103 may be locked to the bracket 133 by a screw 134 in threaded engagement with the bracket 133 and arranged so that its end presses into the bar 103.

For supporting the cutting blowpipe mechanism, there is preferably secured to the front of carriage C, a forwardly extending slideway 248 along which a slider 149 is movable. The slider 149 is positionable along the slideway 248 by a crank handle 250 which turns a screw threadedly engageable with the slider in the usual manner. The slider 149 carries a torch-supporting mechanism of any desired type which however is preferably a plate-riding device 252 of the type disclosed and claimed in the U. S. Patent No. 2,373,-541 issued April 10, 1945, to R. Chelborg and H. Pufahl. Such plate-riding device carries a cluster of cutting blowpipe nozzles at an accurate elevation from the surface of the plate being cut, the nozzles also held in such relation to each other that the desired trimming and beveling operations may be simultaneously carried out during movement of the plate-rider device on the surface of the work. The nozzle cluster may be similar to that disclosed in the aforementioned U. S. application.

Gases such as fuel gas, heating oxygen, and cutting oxygen are supplied to the blowpipe nozzles by flexible hose connections 254 which in turn are coupled to control valves in the customary manner. Such control valves, devices for operating the control valves, and controllers for the truck drive motor and the cutting unit drive motors, are preferably located close together within reach of a single operator, for example at the left-hand end of the bridge member B. Thus, certain controls 255 are mounted at the left end of the girder 40 on its front face and electrical push-button controls may be mounted in a box 256 at the end of a conduit 157.

When fairing cuts are to be made or when the longitudinal edges of the plate are to be shape cut to provide a contour thereon according to a pattern or templet, the carriages C are employed in conjunction with the templet-follower mechanism F. One or more templets 51 are mounted in a group 22 between the track R and the plate W. The cam surfaces of the templets are uppermost. The templet-follower mechanism F is positioned by a crank 113 until the cam-follower roller 57 is in position to engage with the cam surface of the templet 51 having the desired contour. The frame of the templet-follower mechanism F is then locked to the track 42 by tightening the screw 118. The lever 92 is shifted to the left in order that the left clutch 81 may be engaged and the right clutch disengaged. The bridge member B and the carriage C are now shifted to position the nozzles at the starting end of the plate. The nozzles will be at the desired distance inward from the corner of the plate, the bridge member B of course having been moved to the correct position, relatively to the templet, and the slider 149 adjusted so that the position of the nozzle at the starting point on the plate corresponds correctly with the starting point on the templet. The screw 134 is now tightened in order to lock the bar 103 to the bracket 133 so that the carriage C must move laterally in accordance with the movement of the horizontal slide 95. The clutch lever 148 is preferably maintained in the clutch disengaging position in order that the carriage C may accurately respond to the movements imparted by the templet-follower mechanism. When ignition of the plate has been obtained and the cutting oxygen applied, the motor in the truck T is energized to move the bridge member longitudinally. As the bridge member moves, increasing elevations of the templet 51 will raise the cam follower 57, and as previously explained, will move the bar 103 inwardly of the plate so that the outline of the cut may be like that of the templet.

If a cut having a different outline is to be made upon the next plate, it is merely necessary to release the lock screw 118 and turn the crank 113 to position the cam-follower roller 57 over an adjacent templet 51 having the desired contour. If another plate is to be shape cut to provide a contour which is the inverse of that of the templet, the shift lever 92 is moved to the right-hand position and then increasing elevations of the templet will cause outward movement of the carriage C while the bridge member B travels longitudinally in the direction of the arrow shown in Fig. 1.

While there have been described what are at present considered to be preferred embodiments of this invention, it will now be obvious to those skilled in the art that various changes and modifications may be made therein without departing from the invention, and it is therefore intended in the appended claims to cover all such changes and modifications as fall within the true spirit and scope of the invention.

What is claimed is:

1. In a blowpipe machine having a horizontally longitudinally movable carriage and a blowpipe carrying unit supported on said longitudinally movable carriage for transverse movement; a templet-follower mechanism having a horizontally movable element connectable to said blowpipe carrying unit for transversely moving the same, and vertically movable templet-follower means operatively connected to said horizontally movable element to move said horizontally movable element and said blowpipe carrying unit proportionately to vertical movements of said follower means, said follower means being adapted to engage with and be moved by a templet cam surface which deviates vertically.

2. A blowpipe machine according to claim 1 in which said templet-follower means is transversely adjustable for positioning it to engage and cooperate with any one of a plurality of adjacent vertically deviating templet cam surfaces having different contours.

3. A blowpipe machine according to claim 1 which includes a transverse track member supported by said longitudinally movable carriage, both said blowpipe carrying unit and said templet-follower mechanism being movably mounted on said track member, said blowpipe carrying unit being substantially freely movable by said horizontally movable element and said templet-follower mechanism being transversely shiftable along the track to desired adjusted positions thereon.

4. In a shape-cutting machine which has a longitudinally movable carriage of the bridge type and a blowpipe carrying unit supported by said carriage for transverse movement; a templet-follower mechanism adjustably supported by said longitudinally movable carriage and transversely positionable thereon, said follower mechanism having a horizontally reciprocable member connectable to said blowpipe carrying unit for transversely moving the same, a vertically movable cam follower, and motion transmitting means connecting the cam follower to said horizontally reciprocable member for moving the latter in accordance with movements of said cam follower; said templet-follower mechanism being positionable for engaging said cam follower with any one of a plurality of vertically deviating templet cam surfaces having differing contours and positioned in planes parallel to the direction of travel of said longitudinally movable carriage.

5. A shape-cutting machine according to claim 4 in which said motion transmitting means is reversible whereby in one adjustment thereof the reciprocable member moves rightward with upward movement of said cam follower and leftward with downward movement of said cam follower and in another adjustment, said reciprocable member moves leftward with upward movement of said cam follower and rightward with downward movement of said cam follower.

6. A shape-cutting machine according to claim 4, in which said motion transmitting means comprises right and left rotatably mounted horizontal shafts which are simultaneously rotated in opposite directions by vertical movements of said cam follower; an axially shiftable clutch member on each shaft and rotatable therewith; an independently rotatable pinion associated with each shaft and positioned to be engaged by the clutch member on the respective shaft when the clutch member is shifted toward the respective pinion, a toothed rack on said horizontally reciprocable member in driving engagement with both said pinions; and a common clutch shifter connected to said clutch members for shifting them oppositely so that in one limit position of the shifter one of said clutch members is engaged with the corresponding pinion and the other clutch member is disengaged to permit free rotation of the other pinion and in another limit position of the shifter said other clutch member is engaged with said other pinion and said first-mentioned clutch member is disengaged.

JAMES H. BUCKNAM.
JOHN H. ROUNTREE.

REFERENCES CITED

The following references are of record in the file of this patent:

UNITED STATES PATENTS

| Number | Name | Date |
|---|---|---|
| 366,811 | Bolgiano | July 19, 1887 |
| 627,435 | Minthorn | June 20, 1899 |
| 647,677 | Leighton | Apr. 27, 1900 |
| 1,347,695 | Gillespie | July 27, 1920 |
| 1,748,870 | Eberle | Feb. 25, 1930 |
| 1,777,497 | Krebs | Oct. 7, 1930 |
| 2,233,098 | Hodnett | Feb. 25, 1941 |
| 2,327,255 | Flygare et al. | Aug. 17, 1943 |

FOREIGN PATENTS

| Number | Country | Date |
|---|---|---|
| 135,962 | Austria | Dec. 27, 1933 |
| 681,494 | Germany | Sept. 23, 1939 |